US008166814B2

(12) United States Patent
Ike et al.

(10) Patent No.: US 8,166,814 B2
(45) Date of Patent: May 1, 2012

(54) FLOW SENSOR AND MANUFACTURING METHOD THEREFOR

(75) Inventors: Shinichi Ike, Tokyo (JP); Hiroshi Hatakeyama, Tokyo (JP); Satoshi Tsuchiya, Tokyo (JP)

(73) Assignee: Yamatake Corporation (JP)

( * ) Notice: Subject to any disclaimer, the term of this patent is extended or adjusted under 35 U.S.C. 154(b) by 549 days.

(21) Appl. No.: 12/191,907

(22) Filed: Aug. 14, 2008

(65) Prior Publication Data

US 2009/0078040 A1 Mar. 26, 2009

(30) Foreign Application Priority Data

Sep. 20, 2007 (JP) ................................. 2007-244545
Sep. 26, 2007 (JP) ................................. 2007-249619

(51) Int. Cl.
*G01F 1/68* (2006.01)
*H01C 17/06* (2006.01)
(52) U.S. Cl. .................. 73/204.26; 29/620; 73/204.23; 73/204.25
(58) Field of Classification Search .. 73/204.22–204.27; 29/620

See application file for complete search history.

(56) References Cited

U.S. PATENT DOCUMENTS

| 6,591,674 B2 * | 7/2003 | Gehman et al. | 73/204.22 |
| 6,981,410 B2 * | 1/2006 | Seki et al. | 73/204.26 |
| 7,117,736 B2 * | 10/2006 | Kamiunten et al. | 73/204.15 |
| 7,181,963 B2 * | 2/2007 | Bork | 73/204.26 |
| 7,185,539 B2 * | 3/2007 | Ike et al. | 73/202.5 |
| 7,383,726 B2 * | 6/2008 | Ike et al. | 73/204.22 |
| 7,765,865 B2 * | 8/2010 | Ike et al. | 73/204.22 |
| 2007/0227260 A1 * | 10/2007 | Ike et al. | 73/861 |

FOREIGN PATENT DOCUMENTS

| CN | 1650175 A | 8/2005 |
| DE | 102004036214 A1 | 2/2006 |
| EP | 1365216 A1 | 11/2003 |
| EP | 1530028 A1 | 5/2005 |
| EP | 1617185 A1 | 1/2006 |
| JP | 2002-168669 | 6/2002 |

(Continued)

OTHER PUBLICATIONS

European Search Report for Application No./Patent No. 08007978.3-1234/2040045 dated Apr. 22, 2010. European Search Report for European Application No. 10191585.8-1234/2282180 dated Feb. 14, 2011.

(Continued)

*Primary Examiner* — Lisa Caputo
*Assistant Examiner* — Jonathan Dunlap
(74) *Attorney, Agent, or Firm* — Cantor Colburn LLP

(57) ABSTRACT

A flow sensor may be formed by bonding a sensor chip formed with a flow rate detecting part and a flow path-forming member that is provided on the sensor chip and is formed with a flow path for a fluid flowing in the flow rate detecting part to each other on the upper surface of a substrate. The flow path-forming member may be formed by bonding a transparent first flow path forming member and a second flow path-forming member to each other. The first flow path forming member has a plate shape, and is provided with an inflow port and a outflow port for the fluid to be measured, and the second flow path forming member has a plate shape, and is provided with a through hole that forms the flow path along the flow of the fluid flowing along the flow rate detecting part.

10 Claims, 10 Drawing Sheets

FOREIGN PATENT DOCUMENTS

| | | |
|---|---|---|
| JP | 2004-325335 | 11/2004 |
| JP | 2006-177984 A | 7/2006 |
| JP | 2007-71687 | 3/2007 |
| JP | 2007-071687 A | 3/2007 |
| WO | 03/093838 A1 | 11/2003 |
| WO | 20061026633 A2 | 3/2006 |

OTHER PUBLICATIONS

Chinese Office Action for Chinese Application No. 201010275240.4, mailed Sep. 22, 2011.

Japanese Office Action, for Japanese Patent Application No. 2007-244545 mailing date of Feb. 10, 2012 with English note.

* cited by examiner

Fig.3A
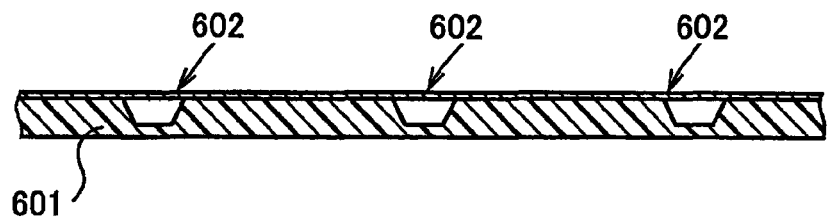
Fig.3B
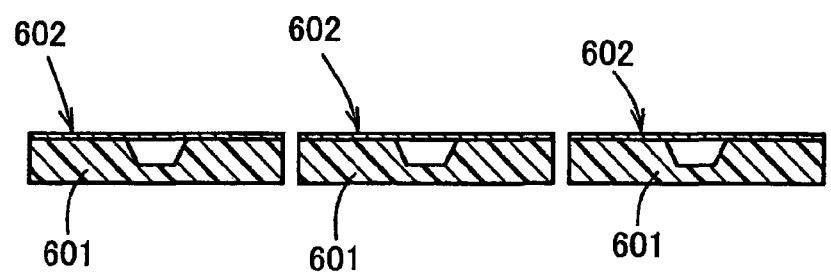
Fig.3C
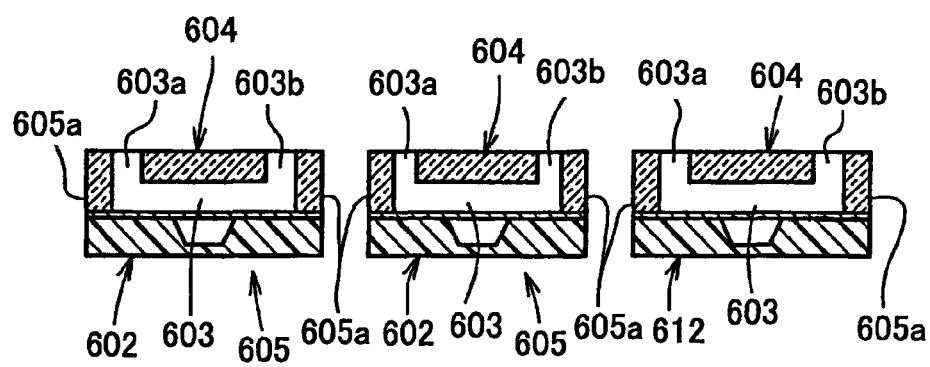
Fig.3 (Related Art)

Fig.9A
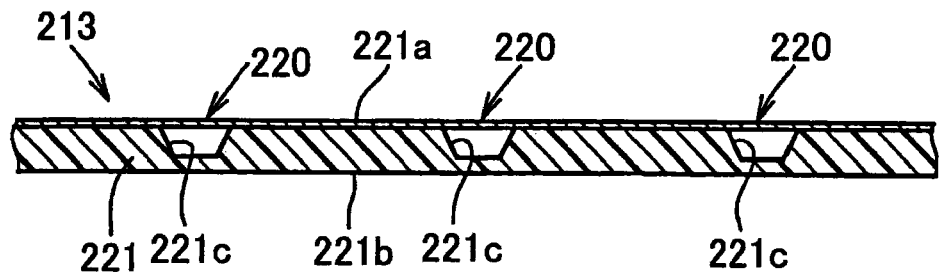
Fig.9B
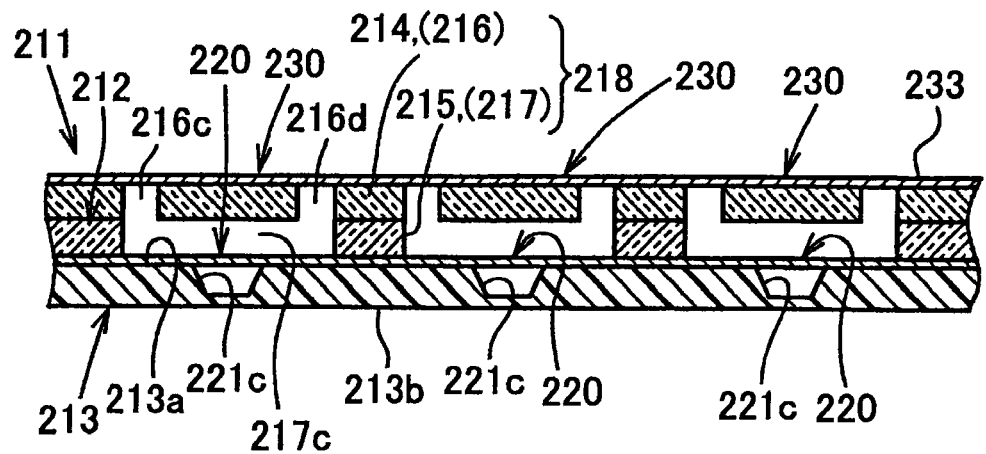
Fig.9C
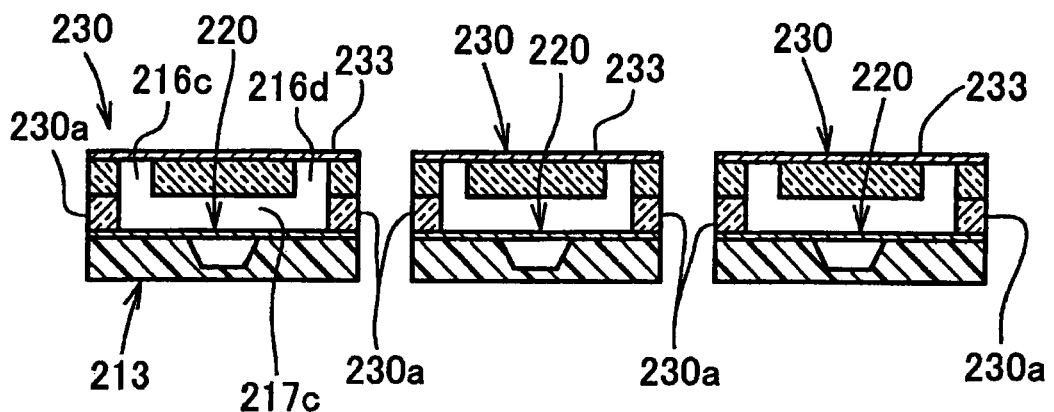
Fig.9

FLOW SENSOR AND MANUFACTURING METHOD THEREFOR

BACKGROUND OF THE INVENTION

1. Field of the Invention

The present invention relates to a flow sensor suitable for the measurement of the very low flow rate of a gas etc. used in, for example, a semiconductor manufacturing apparatus.

2. Description of the Related Art

For example, as a flow sensor (flow rate measuring device) for detecting the flow rate of a fluid to be measured such as a gas used in a semiconductor manufacturing apparatus, a thermal flow sensor has been known which measures a very low flow rate by measuring the temperature difference of a fluid at a predetermined position by adding heat to the fluid (for example, refer to Patent Document 1: Japanese Unexamined Patent Application Publication No. 2002-168669 (pp. 5-6, FIG. 1), Patent Document 2: Japanese Unexamined Patent Application Publication No. 2004-325335 (pp. 6-7, FIG. 8), and Patent Document 3: Japanese Unexamined Patent Application Publication No. 2007-071687 (pp. 2-3, FIG. 7)). As described in Patent Document 3, the thermal flow sensor includes a sensor chip formed with a flow rate detecting part on the upper surface thereof and a glass chip, serving as a flow path forming member, bonded to the upper surface, on which the flow rate detecting part of the sensor chip is formed, of the sensor chip with frit glass or the like.

The sensor chip has a heater (Rh) that is formed with an electric insulating film layer on the upper surface of a silicon substrate and forms the flow rate detecting part therein, an upstream-side temperature measurement sensor (Ru), a downstream-side temperature measurement sensor (Rd), and an ambient temperature sensor (Rr), each of which is formed by a platinum thin film. The platinum thin film functions as a temperature measurement resistor because the resistance value thereof changes according to temperature. The heater (Rh) is arranged in the central part of the substrate, and on both sides thereof, the upstream-side temperature measurement sensor (Ru) and the downstream-side temperature measurement sensor (Rd), serving as temperature measurement sensors, are arranged. The ambient temperature sensor is arranged in the surrounding part of the silicon substrate.

The central part on the upper surface of the silicon substrate formed with the heater (Rh), the upstream-side temperature measurement sensor (Ru), and the downstream-side temperature measurement sensor (Rd) is formed into a concave part by removing the silicon in the lower part thereof by anisotropic etching, and the heater (Rh), the upstream-side temperature measurement sensor (Ru), and the downstream-side temperature measurement sensor (Rd) have a diaphragm construction thermally isolated from the silicon substrate.

The glass chip is formed with a flow path for a fluid flowing on the flow rate detecting part, a fluid inflow port for introducing the fluid to be measured into the flow path, and a fluid outflow port for delivering the fluid to be measured which is introduced into the flow path. These flow path, fluid inflow port, and fluid outflow port are formed by sandblasting or the like. The flow rate detecting part is arranged so as to be exposed into the flow path, and measures the flow rate of the fluid to be measured such as a gas flowing in the flow path by detecting the temperature difference of the heater (Rh) between the upstream-side temperature measurement sensor (Ru) and the downstream-side temperature measurement sensor (Rd).

FIGS. 1 and 2 show one example of a thermal flow sensor relating to the present invention. A thermal flow sensor 501 is formed by bonding a sensor chip 504, in which a flow rate detecting part 503 is formed on a silicon substrate 502, and a transparent glass chip 505 serving as a flow path forming member, which accommodates a flow rate detecting part (sensor part) 503 and is formed with a flow path (groove) 505a for a fluid flowing in the flow rate detecting part (sensor part) 503, to each other. The flow path 505a of the glass chip 505 is formed by sandblasting or the like.

By configuring the flow sensor 501 in this manner, in the inspection process after the manufacture of the flow sensor 501, whether or not an abnormality is present in the flow rate detecting part 503 and the flow path can be checked visually. Further, check can be made to see whether or not minute dust etc. mix in the fluid to be measured after the use and enter into the flow path 505a, or whether or not the dust etc. give any trouble to the flow rate detecting part 503.

FIG. 3 shows a manufacturing method for the flow sensor relating to the present invention. As shown in FIG. 3A, a plurality of sensor chips 602 are formed on the upper surface (top surface) of a silicon wafer 601, and the wafer 601 is cut by dicing, by which the plurality of sensor chips 602 are separated as shown in FIG. 3B. Then, as shown in FIG. 3C, a glass chip 604 formed with a flow path 603, a fluid inflow port 603a, and a fluid outflow port 603b is placed on each of the individually separated sensor chip 602, and is positioned so that a flow rate detecting part is exposed into the flow path 603, by which a flow sensor 605 is manufactured by bonding the glass chip 604 to the upper surface of the sensor chip 602 with a glass having a low melting point, for example, frit glass or the like. The glass chip 604 is also formed individually like the sensor chip 602 by dicing a wafer on which the plurality of glass chips 604 are formed.

First, a first problem to be solved in the present invention is explained. In the method for forming the flow path 505a of the glass chip 505 by sandblasting, it is difficult to uniformly fabricate the height h from an upper surface 504a of the sensor chip 504 to an inside upper surface 505b of the flow path 505a of the glass chip 505 (hereinafter referred to as a "sensor flow path height") as shown in FIGS. 1 and 2, so that it is difficult to enhance the fabrication accuracy. Therefore, the cross-sectional area S (=h X w, w is the width of the flow path 505a) of the flow path 505a near the flow rate detecting part 503 is sometimes not as designed. Since the flow rate Q is determined by the cross-sectional area S of the sensor flow path, the flow rate property (flow rate curve) changes as the cross-sectional area S of the flow path 505a changes. Therefore, adjustment of large span is needed, and it is difficult to achieve the stability of quality because the individual difference between the flow sensors arises.

Also, if the flow path 505a of the glass chip 505 is fabricated by sandblasting, the surface of the inside upper surface 505b of the flow path 505a, which is a fabricated surface, becomes rough and has poor transparency. Therefore, to enhance the transparency, post-treatment is needed. Also, the pressure resistance of glass chip may decrease due to a minute flaw induced at the time of sandblasting.

Successively, a second problem to be solved in the present invention is explained. The flow rate detecting part of flow sensor is formed into a very thin and small shape to enable a very low flow rate to be measured with high sensitivity. Therefore, the flow rate detecting part is easy to break, and if dirt adheres to the flow rate detecting part, a change in heat balance between the upstream side and the downstream side of heater cannot be detected well.

Thereupon, when the wafer 601 on which the plurality of sensor chips 602 are formed is cut by dicing to separate the sensor chips 602 as shown in FIG. 3, a complicated manufacturing process is needed to protect the flow rate detecting part from the adhesion of swarf and to protect it from the shock of a liquid coolant used in dicing. As a result, the production efficiency of flow sensor decreases, and also the yield of product decreases.

Also, in order to lessen an influence of swarf and liquid coolant on the flow rate detecting part when the wafer 601 on which the plurality of sensor chips 602 are formed is cut, for example, the use of a laser dicing device or the like can be thought. However, the laser dicing device is very high in cost, and accordingly the manufacturing cost of flow sensor increases. Also, even in the case where the laser dicing device is used, in the process from the separation of the sensor chips 602 from the wafer 601 to the bonding of the glass chip to the sensor chip 602, dirt may adhere to the flow rate detecting part of the sensor chip 602.

Also, if the individually separated glass chip 604 is lappingly bonded onto the upper surface of the individually separated sensor chip 602 as shown in FIG. 3C, the external dimensions varies due to a positional shift at the time of bonding, and also it is difficult to flush a side surface 605a of the flow sensor 605, so that a level difference is produced. If such a level difference is present, the dimensional tolerance of chip external shape varies, and therefore the positioning accuracy at the time of packaging of flow sensor decreases.

SUMMARY OF THE INVENTION

An object of the present invention is to provide a flow sensor that can be manufactured at a low cost and has high detection accuracy, and a manufacturing method for the flow sensor.

A specific first object of the present invention is to provide a flow sensor in which the fabrication accuracy of the cross-sectional area of a sensor flow path is improved to decrease the individual difference, by which the flow rate detection accuracy is stabilized.

Also, a specific second object of the present invention is to provide a flow sensor in which the production efficiency of flow sensor formed by bonding a flow path forming member onto the surface on which the flow rate detecting part of a sensor chip is formed can be increased, and the flow rate detecting part can be protected effectively at the manufacturing time, and a manufacturing method for the flow sensor.

To achieve the first object, in the flow sensor in accordance with the present invention that is formed by bonding a sensor chip, in which a flow rate detecting part is formed on an electric insulating film coated so as to cover at least a part of a concave part formed in the upper surface of a substrate, and a flow path forming member, which is provided on the sensor chip to form the flow path of a fluid flowing in the flow rate detecting part, to each other, wherein the flow path forming member is formed by bonding a first flow path forming member, which is a transparent member, and a second flow path forming member to each other;

the first flow path forming member has a plate shape and is provided with an inflow port and a outflow port for the fluid to be measured;

the second flow path forming member has a plate shape and is provided with a through hole that forms a flow path along the flow of the fluid flowing along the flow rate detecting part;

the through hole is configured so that both ends thereof communicate with the inflow port and the outflow port, and the flow rate detecting part is arranged between the portions corresponding to the inflow port and outflow port of the through hole; and the first and second flow path forming members form a flow path having a predetermined cross-sectional area.

The flow path forming member is formed by the first flow path forming member, which has a transparent plate shape and is provided with the inflow port and outflow port for the fluid, and a second flow path forming member, which has a plate shape and is provided with the through hole that forms the flow path along the flow of the fluid flowing along the flow rate detecting part provided on the sensor chip, both ends of the through hole are caused to communicate with the inflow port and the outflow port to form the flow path having a predetermined cross-sectional area, and the flow rate detecting part is arranged in the through hole. Thereby, the height of the sensor flow path, that is, the cross-sectional area of the through hole can be made fixed, and therefore the individual difference in the cross-sectional area of flow path between the sensors can be decreased. As a result, the quality of flow sensor can be stabilized while the transparency of the first flow path forming member is secured.

Preferably, the flow sensor in accordance with the present invention is characterized in that in the above-described flow sensor, the second flow path forming member is formed by a member having a thermal expansion coefficient equal to or approximately equal to that of the sensor chip.

Since the sensor chip and the second flow path forming member are bonded to each other, by causing the sensor chip and the second flow path forming member to have a thermal expansion coefficient equal to or approximately equal to each other, even if a temperature change around the sensor chip and the second flow path forming member occurs, each of the sensor chip and the second flow path forming member is less liable to be distorted, so that the output of sensor is difficult to drift, whereby the measurement accuracy of sensor can be prevented from decreasing.

Also, preferably, the flow sensor in accordance with the present invention is characterized in that in the above-described flow sensor, the second flow path forming member is formed of either one of silicon and borosilicate glass.

Since the sensor chip and the second flow path forming member are made of a silicon material having a thermal expansion coefficient equal to each other or the second flow path forming member is made of borosilicate glass having a thermal expansion coefficient approximately equal to that of the silicon material, the sensor chip and the second flow path forming member are less liable to be distorted by the temperature change etc. around the sensor chip and the second flow path forming member, so that the output of sensor is difficult to drift, whereby the measurement accuracy of sensor can be prevented from decreasing.

In particular, the silicon material is a material capable of providing high fabrication accuracy, and the second flow path forming member also has high fabrication accuracy, and therefore can be manufactured as designed. As a result, the cross-sectional area of flow path can be made as designed, so that the flow rate detection accuracy of flow sensor can be stabilized.

Also, preferably, the flow sensor in accordance with the present invention is characterized in that in the above-described flow sensor, the first flow path forming member is formed of borosilicate glass.

Since the borosilicate glass of the first flow path forming member and the silicon material or borosilicate glass of the second flow path forming member have a thermal expansion coefficient approximately equal to or equal to each other, each of the first and second flow path forming members is less liable to be distorted by the temperature change etc. around the first and second flow path forming members, so that the distortion does not transmit to the sensor chip via the second flow path forming member. Therefore, the output of sensor is difficult to drift, whereby the measurement accuracy of sensor can be prevented from decreasing.

To achieve the second object, in the flow sensor in accordance with the present invention that is formed by bonding a sensor chip, in which a flow rate detecting part is formed on an electric insulating film coated so as to cover at least a part of a concave part formed in the upper surface of a substrate, and a flow path forming member, which is provided on the sensor chip to form the flow path of a fluid flowing in the flow rate detecting part, to each other, the flow sensor is a work formed by a first wafer formed with the plurality of flow path forming members and a second wafer formed with the plurality of sensor chips so as to correspond to the plurality of flow path forming members, and consists of an individual flow sensor separated by cutting the work, in which the flow rate detecting part is positioned so as to be arranged in the flow path of the flow path forming member and the plurality of flow sensors each formed with the sensor chip and the flow path forming member as a set are formed, by dicing; the flow sensor having a flush cut surface cut by dicing.

Also, the manufacturing method for a flow sensor in accordance with the present invention, the flow sensor including a sensor chip, in which a flow rate detecting part is formed on an electric insulating film coated so as to cover at least a part of a concave part formed in the upper surface of a substrate, and a flow path forming member, which is provided on the sensor chip to form the flow path of a fluid flowing in the flow rate detecting part, includes:

a work forming step of forming a work by bonding a first wafer formed with the plurality of flow path forming members to a second wafer formed with the plurality of sensor chips so as to correspond to the plurality of flow path forming members, the work forming step including a positioning step in which the flow rate detecting part is positioned so as to be arranged in the flow path of the flow path forming member and the plurality of flow sensors each of which is formed with the sensor chip and the flow path forming member as a set are formed; and a sensor separating step of cutting the work formed in the work forming step by dicing to separate the work into the plurality of flow sensors.

The work is formed by bonding the first wafer formed with the plurality of flow path forming members to the second wafer formed with the plurality of sensor chips so as to correspond to the plurality of flow path forming members. In the work, the flow rate detecting part is positioned so as to be exposed into the flow path of the flow path forming member and the plurality of flow sensors each of which is formed with the sensor chip and the flow path forming member as a set are formed. The work is cut by dicing to separate the work into the plurality of flow sensors. Each of the flow sensors has a flush cut surface cut by dicing, so that a positional shift between the flow path forming member and the sensor chip does not occur, and therefore the external dimensions do not vary. If the external shape of chip is made uniform by dicing in this manner, the variations in external dimensions are restrained, so that assembling can be performed easily.

Preferably, the manufacturing method for a flow sensor in accordance with the present invention is characterized in that in the above-described manufacturing method for a flow sensor, a masking step for closing the opening of the flow path of the flow path forming member is added to between the work forming step and the sensor separating step.

Thereby, swarf can be prevented surely from entering into the flow path of the flow path forming member when the work is cut by dicing to separate the work into the flow sensors, and swarf can be prevented from adhering to the flow rate detecting part of the sensor chip. Also, swarf and liquid coolant can be prevented effectively from entering into the flow path through the fluid inflow port and the fluid outflow port when the work is cut by dicing. As a result, the adhesion of swarf to the flow rate detecting part, the damage to the flow rate detecting part caused by the shock of liquid coolant, and the like are prevented.

Thereby, the product yield is improved. Also, a flow sensor having a good heat balance can be formed by a low-cost and simple process. Therefore, the manufacturing method in accordance with the present invention is very effective in manufacturing the flow sensor in which the flow rate detecting part is formed delicately with high sensitivity. Also, during the process after cutting and until the next step or during transportation, dirt can be prevented from entering into the flow path.

Also, preferably, the manufacturing method for a flow sensor in accordance with the present invention is characterized in that in the above-described manufacturing method for a flow sensor, in the sensor separating step, the work is cut in the state in which the opening of the flow path of the flow path forming member is directed to the downside.

When the work is cut, by cutting the work in the state in which the work is turned over, that is, the second wafer (the sensor chip side) is on the upside, and the first wafer (the flow path forming member side) is on the downside, swarf can be made less liable to enter into the flow path of the flow path forming member when the flow sensors are separated. Thereby, swarf can be made less liable to adhere to the flow rate detecting part of the sensor chip, and also swarf and liquid coolant can be made less liable to enter into the flow path through the fluid inflow port and the fluid outflow port when the work is cut by dicing. As a result, the adhesion of swarf to the flow rate detecting part, the damage to the flow rate detecting part caused by the shock of liquid coolant, and the like are prevented, and the product yield is improved. Also, a flow sensor having a good heat balance can be formed by a low-cost and simple process.

Also, preferably, the flow sensor in accordance with the present invention is characterized in that in the above-described flow sensor, the flow path forming member is formed by a first flow path forming member and a second flow path forming member;

the first wafer is formed by bonding a first flow path forming wafer including the plurality of first flow path forming members and a second flow path forming wafer including the plurality of second flow path forming members to each other;

each of the plurality of flow path forming members included in the first flow path forming wafer is provided with an inflow port and a outflow port for a fluid to be measured; and each of the plurality of flow path forming members included in the second flow path forming wafer is provided with a through hole that forms a flow path along the flow of the fluid flowing along the flow rate detecting part, both ends of the through hole communicate with the inflow port and outflow port corresponding to the through hole, and the plurality of flow rate detecting parts included in the second wafer are arranged in the plurality of through holes included in the first wafer.

Also, preferably, the manufacturing method for a flow sensor in accordance with the present invention is characterized in that, the flow sensor is configured so that the flow path forming member is formed by a first flow path forming member and a second flow path forming member;

the first wafer is formed by bonding a first flow path forming wafer including the plurality of first flow path forming members and a second flow path forming wafer including the plurality of second flow path forming members to each other;

each of the plurality of flow path forming members included in the first flow path forming wafer is provided with an inflow port and a outflow port for a fluid to be measured; and each of the plurality of flow path forming members included in the second flow path forming wafer is provided with a through hole which forms a flow path along the flow of the fluid flowing along the flow rate detecting part, both ends of the through hole communicate with the inflow port and outflow port corresponding to the through hole, and the plurality of flow rate detecting parts included in the second wafer are arranged in the plurality of through holes included in the first wafer.

The flow path forming member is formed by the first flow path forming member and the second flow path forming member, and the first wafer is formed by bonding the first flow path forming wafer forming the first flow path forming member and the second flow path forming wafer forming the second flow path forming member to each other. In the first flow path forming wafer, each of the plurality of flow path forming members is provided with the inflow port and the outflow port for the fluid to be measured, and in the second flow path forming wafer, each of the plurality of flow path forming members is provided with the through hole forming the flow path along the flow of fluid flowing along the flow rate detecting part. Both ends of the through hole communicate with the inflow port and the outflow port, and the flow rate detecting part is arranged in the through hole. Thereby, the flow path forming member can be formed easily, and the first wafer can be configured easily. Also, the cross-sectional area of the flow path of the flow path forming member can be formed exactly, and the individual difference between the flow sensors can be decreased.

BRIEF DESCRIPTION OF THE DRAWINGS

FIG. 3 is an explanatory view showing a manufacturing process for a flow sensor relating to the present invention;

FIG. 9 is an explanatory view showing a manufacturing process of a manufacturing method for a flow sensor in accordance with the present invention.

DETAILED DESCRIPTION OF THE PREFERRED EMBODIMENTS

Figure 1:
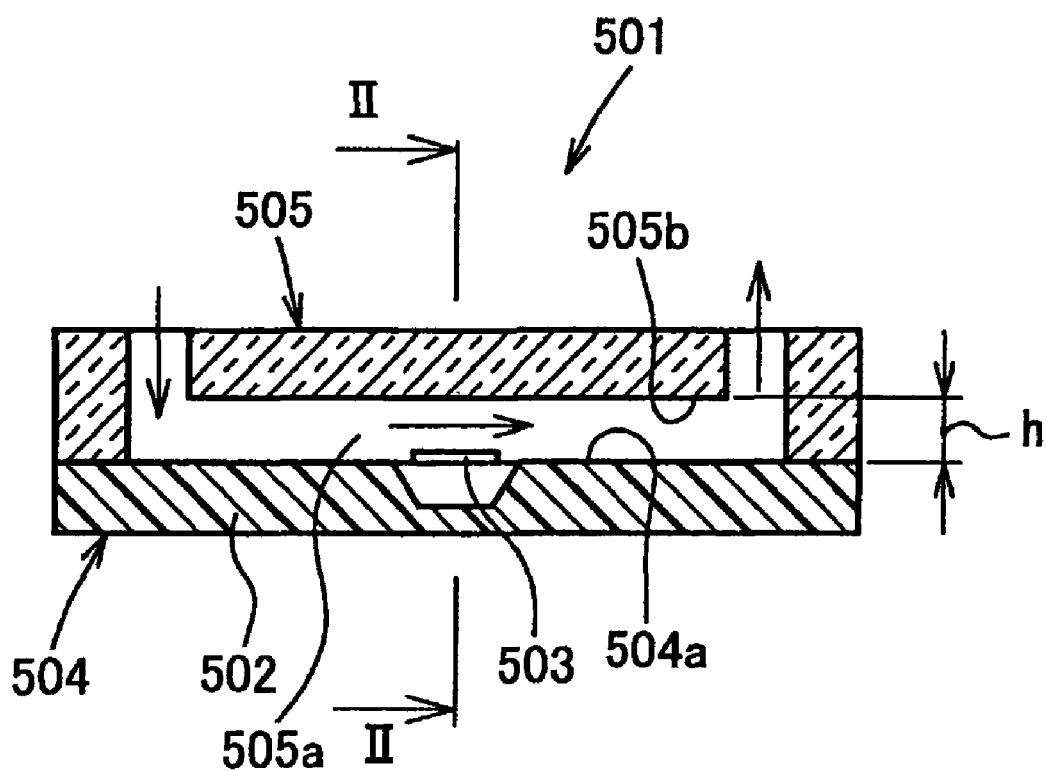
FIG. 1 is a sectional view showing one example of a flow sensor relating to the present invention.
Figure 2:
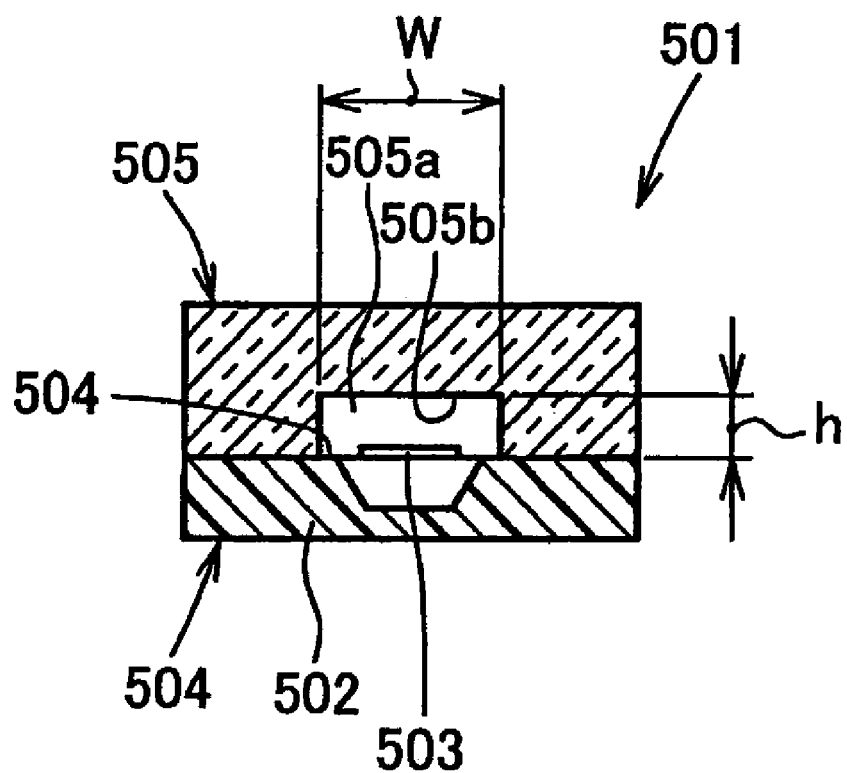
FIG. 2 is a sectional view taken along the line II-II of the flow sensor shown in FIG. 1.
Figure 4:
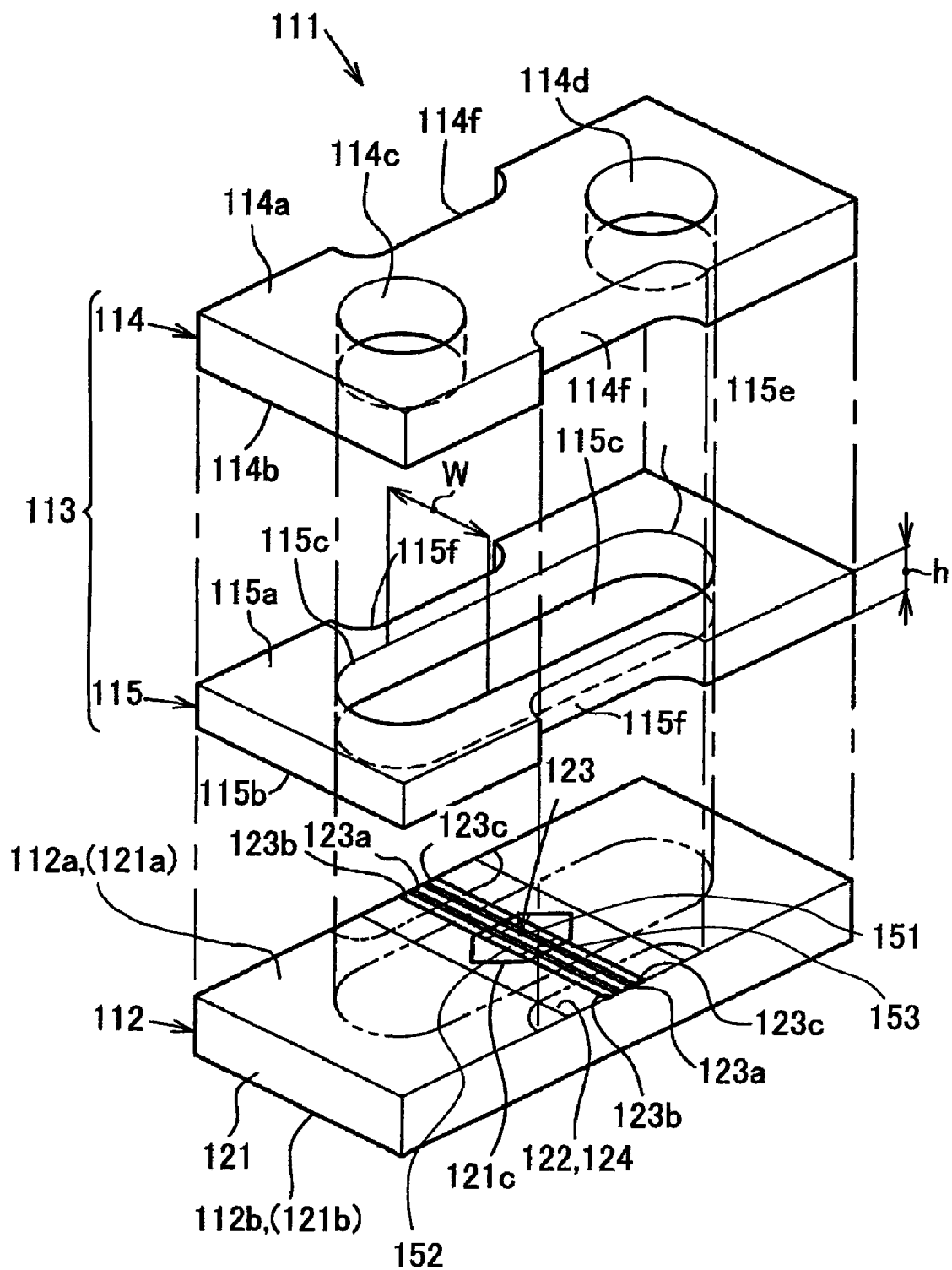
FIG. 4 is a perspective view showing a state in which a flow sensor in accordance with the present invention is disassembled.

Hereunder, a flow sensor in accordance with a first embodiment of the present invention is explained with reference to the accompanying drawings. FIG. 4 is a perspective view showing a state in which a flow sensor in accordance with the present invention is disassembled. A flow sensor 111 is formed by a sensor chip 112, and a first flow path forming member (glass chip) 114 and a second flow path forming member 115, both of which form a flow path forming member 113.

The sensor chip 112 is configured so that an electric insulating film (thin film) 122 of silicon nitride or silicon dioxide is formed on an upper surface 121a of a silicon substrate 121 having a rectangular parallelepiped shape, a flow rate detecting part (sensor part) 123 is formed at the position of the electric insulating film 122, and further the flow rate detecting part 123 is covered by an electric insulating film 124 of silicon nitride or silicon dioxide. In FIG. 4, the electric insulating films 122 and 124 are drawn so as to be transparent for ease of understanding of the flow rate detecting part 123.

Figure 5:
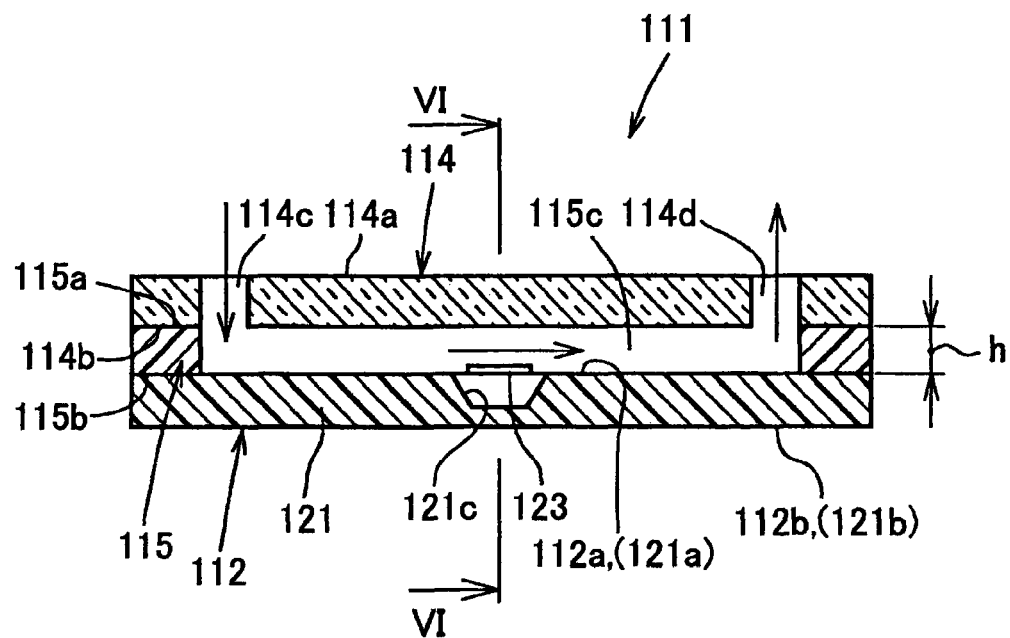
FIG. 5 is a sectional view showing a state in which the flow sensor shown in FIG. 4 is assembled.
Figure 6:
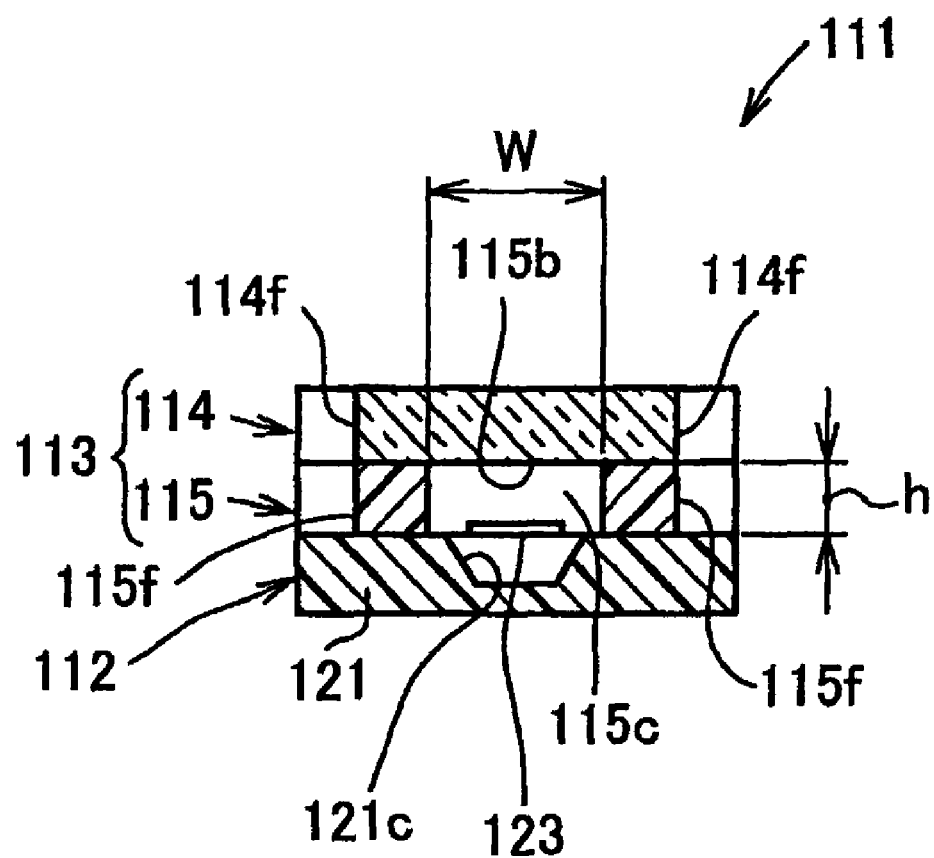
FIG. 6 is a sectional view taken along the line VI-VI of the flow sensor shown in FIG. 5.

At the central position of the upper surface 121a of the silicon substrate 121, a concave part 121c is formed on the lower side of the flow rate detecting part 123 as shown in FIGS. 5 and 6. The portion in which the electric insulating film 122 formed with the flow rate detecting part 123 covers the concave part 121c, which serves as a diaphragm, thermally isolates the flow rate detecting part 123 from the silicon substrate 121. As shown in FIG. 4, the flow rate detecting part 123 is a thermal detecting part, and is formed by a heater 151, serving as a heat generating element, formed on the electric insulating film 122 using, for example, a platinum (Pt) thin film, and temperature measuring elements 152 and 153, serving as resistive elements, which are arranged at equal intervals on the upstream side and the downstream side of the heater 151 and each of which is formed by, for example, a platinum thin film.

Lead patterns 123a, 123b and 123c, serving as signal take-off wires for the heater 151 and temperature measuring elements 152 and 153 of the flow rate detecting part 123, are extended to the positions on both side surfaces of the silicon substrate 121. The tip end parts of these lead patterns 123a to 123c can be connected to an external measurement circuit, not shown.

The first flow path forming member 114 has the same size as that of the upper surface 121a of the silicon substrate 121, and also has a predetermined thickness. In the first flow path forming member 114, an inflow port 114c and a outflow port 114d for the fluid to be measured are formed at positions on both sides on the centerline along the lengthwise direction of an upper surface 114a so as to penetrate to a lower surface 114b. These inflow port 114c and outflow port 114d have the same size. Also, on both side surfaces of the first flow path forming member 114, a notch 114f (refer to FIG. 4) is provided at a position corresponding to the lead patterns 123a to 123c of the flow rate detecting part 123, so that the connecting parts of the tip ends of the lead patterns 123a to 123c are exposed, and can be connected to the external measurement circuit. The first flow path forming member 114 is formed of transparent borosilicate glass. The inflow port 114c and the outflow port 114d are formed by sandblasting or machining such as end milling, and are finished by wet etching or dry etching.

Also, the first flow path forming member 114 is merely formed with the inflow port 114c and the outflow port 114d for the fluid, so that even in the case where these holes are formed by sandblasting, the transparency of a portion between the inflow port 114c and the outflow port 114d is secured. Thereby, the visibility from the outside of the flow rate detecting part 123 is secured.

As the borosilicate glass, for example, a glass called Pyrex (registered trademark) glass or Tempax glass is available. In this embodiment, a transparent Pyrex (registered trademark) glass is used. Thereby, the transparency of the first flow path forming member 114 can be secured. By using the Tempax glass, the transparency can be secured similarly.

The second flow path forming member 115 has a rectangular plate shape having the same size as that of the first flow path forming member 114, and on the centerline along the lengthwise direction of an upper surface 115a thereof, an elliptical hole (track-shaped circle) 115c that is long along the lengthwise direction is formed on the centerline along the lengthwise direction of an upper surface 115a so as to penetrate to a lower surface 115c (hereinafter referred to as a "through hole 115c"). This through hole 115c is formed so that the width thereof is the same as the diameter of the inflow port 114c or the outflow port 114d, and semicircular parts 115d and 115e at both ends thereof coincide with the semicircular parts on both end sides of the inflow port 114c and the outflow port 114d. Also, on both side surfaces of the second flow path forming member 115, a notch 115f having the same shape as that of the notch 114f of the first flow path forming member 114 is formed so as to correspond to the notch 114f, so that the connecting parts of the tip ends of the lead patterns 123a to 123c are exposed, and can be connected to the external measurement circuit.

The width of the through hole 115c is greater than the width of the flow rate detecting part 123 formed on an upper surface 112a of the sensor chip 112. The through hole 115c is formed by sandblasting or machining such as end milling, and may be finished by wet etching or dry etching.

The second flow path forming member 115 is formed of a silicon plate, and the through hole 115c is used as a flow path for a fluid flowing in the flow rate detecting part 123 formed on the sensor chip 112. By forming the second flow path forming member 115 of a silicon plate, the thickness thereof can be fabricated exactly into a fixed thickness. Thereby, the depth of the through hole 115c, that is, the height h of the sensor flow path can be formed exactly, so that the cross-sectional area of flow path can be formed exactly.

A silicon member is used as the second flow path forming member by two reasons. The first reason is that since the fabrication accuracy is high, the cross-sectional area of sensor flow path near the flow rate detecting part 123 can be formed as designed as compared with the art relating to the present invention. The second reason is that since the sensor chip 112 is made of silicon, and the first flow path forming member 114 is made of borosilicate glass, the material of the second flow path forming member is preferably a substance having a thermal expansion coefficient approximately equal to that of silicon that is the material of the sensor chip 112 and is preferably a substance having a thermal expansion coefficient approximately equal to that of borosilicate glass.

The reason why since the sensor chip and the second flow path forming member are bonded to each other, the second flow path forming member 115 is preferably made of a material having a thermal expansion coefficient approximately equal to that of the material of the sensor chip 112 is that if these elements have a thermal expansion coefficient approximately equal to each other, each of the sensor chip 112 and the insulating material is less liable to be distorted by the temperature change etc. around the sensor chip 112 and the insulating material, so that the output of the flow sensor is difficult to drift, whereby the measurement accuracy of sensor can be prevented from decreasing. Incidentally, the thermal expansion coefficient of Pyrex (registered trademark) glass is $3.2 \times 10^{-6}/°$ C., and the thermal expansion coefficient of silicon is $2.3 \times 10^{-6}/°$ C.

Next, the procedure for manufacturing the flow sensor 111 is explained briefly. As shown in FIGS. 4 and 5, the first flow path forming member (glass chip) 114 is put on top of the second flow path forming member (silicon) 115, and the lower surface 114b of the first flow path forming member 114 is bonded to the upper surface 115a of the second flow path forming member 115 by a method such as anode bonding to form the flow path forming member 113. When the first flow path forming member (glass chip) 114 and the second flow path forming member (silicon) 115 are positioned to each other, these two members are arranged so that the inflow port 114c and the outflow port 114d formed in the first flow path forming member (glass chip) 114 coincide with both ends of the through hole 115c formed in the second flow path forming member (silicon) 115 and communicate with each other, and the notches 114f and 115f on both side parts coincide with each other.

The anode bonding, which is the bonding method in the above-mentioned process, may be performed in a wafer state (before dividing into chips) with each of the first flow path forming member (glass chip) 114 and the second flow path forming member (silicon) 115 being a wafer. Also, the anode bonding may be performed after the wafer is divided into chips.

Incidentally, in this embodiment, the thickness of the first flow path forming member (glass chip) 114 is about 0.5 to 1.0 mm and the thickness of the second flow path forming member (silicon-made plate), that is, the height (h) of sensor flow path is about 0.2 to 1.0 mm. The size of the sensor chip 112 is about 1.5 mm×3.5 to 6.0 mm×12.0 mm.

Then, the flow path forming member 113 formed as described above is placed on the upper surface 112a of the sensor chip 112, and is positioned so that the upper surface of the flow rate detecting part 123 is exposed at a substantially central position in the through hole 115c in the second flow path forming member (silicon) 115 and the connecting parts at the tip ends of the lead patterns 123a to 123c of the flow rate detecting part 123 are exposed from the notches 115f and 114f. Then, the lower surface 115b of the second flow path forming member (silicon) 115 is bonded to the upper surface 112a of the sensor chip 112 (the upper surface 121a of the silicon substrate 121) by a method such as anode bonding.

Thereby, since the flow rate detecting part 123 is disposed in the through hole 115c constituting a part of the sensor flow path, the fluid to be measured can be measured, and the flow rate detecting part 123 can be seen from the outside of the flow sensor 111 through the first flow path forming member (glass chip) 114, which is a transparent member.

The flow path of the flow sensor 111 is formed by the inflow port 114c and the outflow port 114d in the first flow path forming member (glass chip) 114 and the through hole 115c in the second flow path forming member (silicon) 115, which allows the inflow port 114c and the outflow port 114d to communicate with each other. The sensor flow path means a flow path formed by the through hole 115c in the second flow path forming member 115 among the flow paths of the flow sensor 111. In this manner, the flow sensor 111 is formed.

The flow sensor 111 is attached to, for example, a semiconductor manufacturing apparatus (not shown). The inflow port 114c and the outflow port 114d in the first flow path forming member (glass chip) 114 are airtightly connected to the passage of the fluid to be measured of the apparatus, and the fluid to be measured flows as indicated by an arrow mark in FIG. 5. Also, the lead patterns 123a to 123c of the flow sensor 111 shown in FIG. 4 are connected to the measurement circuit, not shown.

The fluid to be measured is introduced from the inflow port 114c into the through hole 115c serving as a flow path, and is delivered from the outflow port 114d after flowing in the through hole 115c. At this time, the heater of the flow rate detecting part 123 is energized. The heater 151 is heated to a certain temperature higher than the gas temperature, which is measured by an ambient temperature sensor provided on the silicon substrate 121, by a control circuit, and heats the gas flowing in the through hole (flow path) 115c.

When the gas does not flow, uniform temperature distribution is formed on the upstream side and the downstream side of the heater, and the temperature measuring element 152 on the upstream side and the temperature measuring element 153 on the downstream side show a resistance value corresponding to the approximately equal temperature. On the other hand, when the gas flows, the uniform temperature distribution on the upstream side and the downstream side of the heater becomes out-of-balance: the temperature on the upstream side decreases, and the temperature on the downstream side increases. The difference in resistance value between the temperature measuring elements 152 and 153, that is, the temperature difference equivalently corresponding to this is detected by, for example, a Wheatstone bridge circuit formed by the temperature measuring element 152 on the upstream side and the temperature measuring element 153 on the downstream side, by which the flow rate of gas flowing in the through hole (flow path) 115c is measured.

In the above-described embodiment, the case where the indirectly heated flow rate detecting part is formed by one heater (heat generating element) and two temperature measuring elements arranged on both sides of the heater has been described. However, the present invention is not limited to this configuration. A self-heat generating flow rate detecting part may be formed by one heat generating element, that is, one heater. Alternatively, a self-heat generating flow rate detecting part may be formed by two heat generating elements, that is, two heaters.

In a scope without departing from the teachings of the present invention, the second flow path forming member having a thermal expansion coefficient approximately equal to that of the sensor chip may be used so as to match the material property of the sensor chip. For example, both of the first flow path forming member and the second flow path forming member can be formed of borosilicate glass. The borosilicate glass has a good flatness and is easy to fabricate, and therefore can be used easily.

As described above, according to the first embodiment of the present invention, the flow path forming member is formed by bonding the transparent plate-shaped first flow path forming member formed with the inflow port and outflow port for the fluid to the plate-shaped second flow path forming member provided with the through hole forming the flow path along the flow of fluid flowing along the flow rate detecting part provided on the sensor chip, both ends of the through hole (flow path) communicate with the inflow port and the outflow port to form the flow path having a predetermined cross-sectional area, and the flow rate detecting part is arranged in the through hole. Thereby, the height of the sensor flow path, that is, the cross-sectional area of the through hole can be fixed. As a result, the individual difference in the cross-sectional area of flow path between the sensors can be decreased, by which the quality of flow sensor can be stabilized.

Also, no minute flaw is induced in the flow path because the flow path is not formed in the first flow path forming member by sandblasting or other means. Therefore, a crack etc. caused by such a minute flaw can be prevented, so that the pressure tightness and durability can be improved. Also, the visibility from the outside can be secured, so that the presence of dust in the flow path can easily be inspected in the process for manufacturing the flow sensor.

Also, since the sensor chip and the second flow path forming member are bonded to each other, by providing the materials of the sensor chip and the second flow path forming member with thermal expansion coefficients that are equal to or approximately equal to each other, the sensor chip and the second flow path forming member are made less liable to be distorted by the temperature change etc. around the sensor chip and the second flow path forming member. Therefore, the output of the sensor is difficult to drift, whereby the measurement accuracy of sensor can be prevented from decreasing.

Also, since the sensor chip and the second flow path forming member are bonded to each other, by using the silicon material, which has a thermal expansion coefficient equal to that of the second flow path forming member, for the sensor chip and the second flow path forming member or by using borosilicate glass, which has a thermal expansion coefficient approximately equal to that of the silicon material, for the second flow path forming member, the sensor chip and the second flow path forming member are made less liable to be distorted by the temperature change etc. around the sensor chip and the second flow path forming member. Therefore, the output of the sensor is difficult to drift, whereby the measurement accuracy of sensor can be prevented from decreasing.

In particular, the silicon material is a material capable of providing high fabrication accuracy, and the second flow path forming member also has high fabrication accuracy, so that the second flow path forming member can be manufactured as designed. Thereby, the cross-sectional area of flow path can be made as designed, so that the flow rate detection accuracy of flow sensor can be stabilized.

Also, since the borosilicate glass of the first flow path forming member and the silicon material or the borosilicate glass of the second flow path forming member are bonded to each other, the borosilicate glass of the first flow path forming member and the silicon material or the borosilicate glass of the second flow path forming member have thermal expansion coefficients approximately equal to or equal to each other. Therefore, the first flow path forming member and the second flow path forming member are less liable to be distorted by the temperature change etc. around the first flow path forming member and the second flow path forming member, and also the distortion does not transmit to the sensor chip via the second flow path forming member. Therefore, the output of the sensor is difficult to drift, whereby the measurement accuracy of sensor can be prevented from decreasing.

Figure 7:
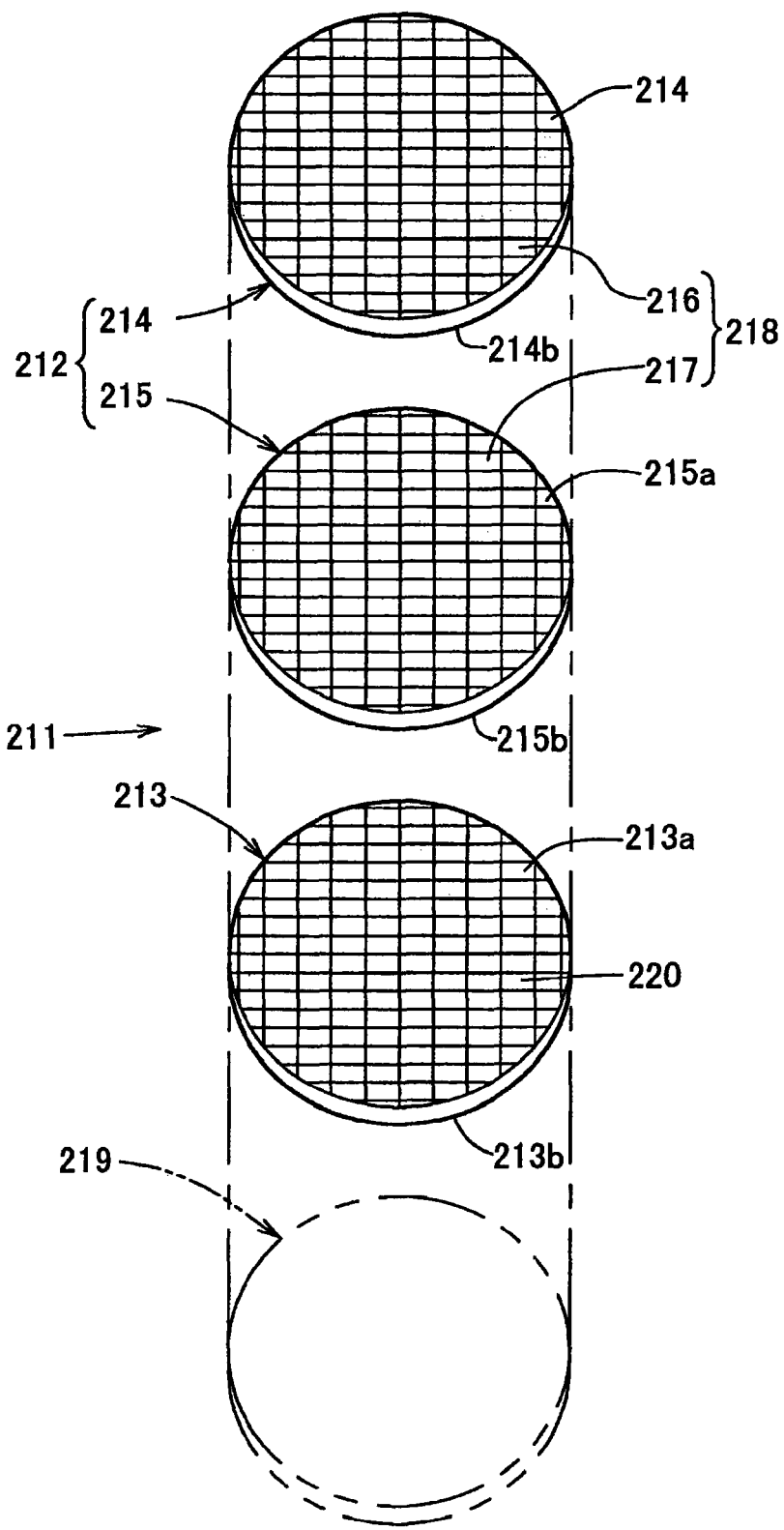
FIG. 7 is a perspective view for explaining the assembling of a work to which a manufacturing method for a flow sensor in accordance with the present invention is applied.
Figure 8:
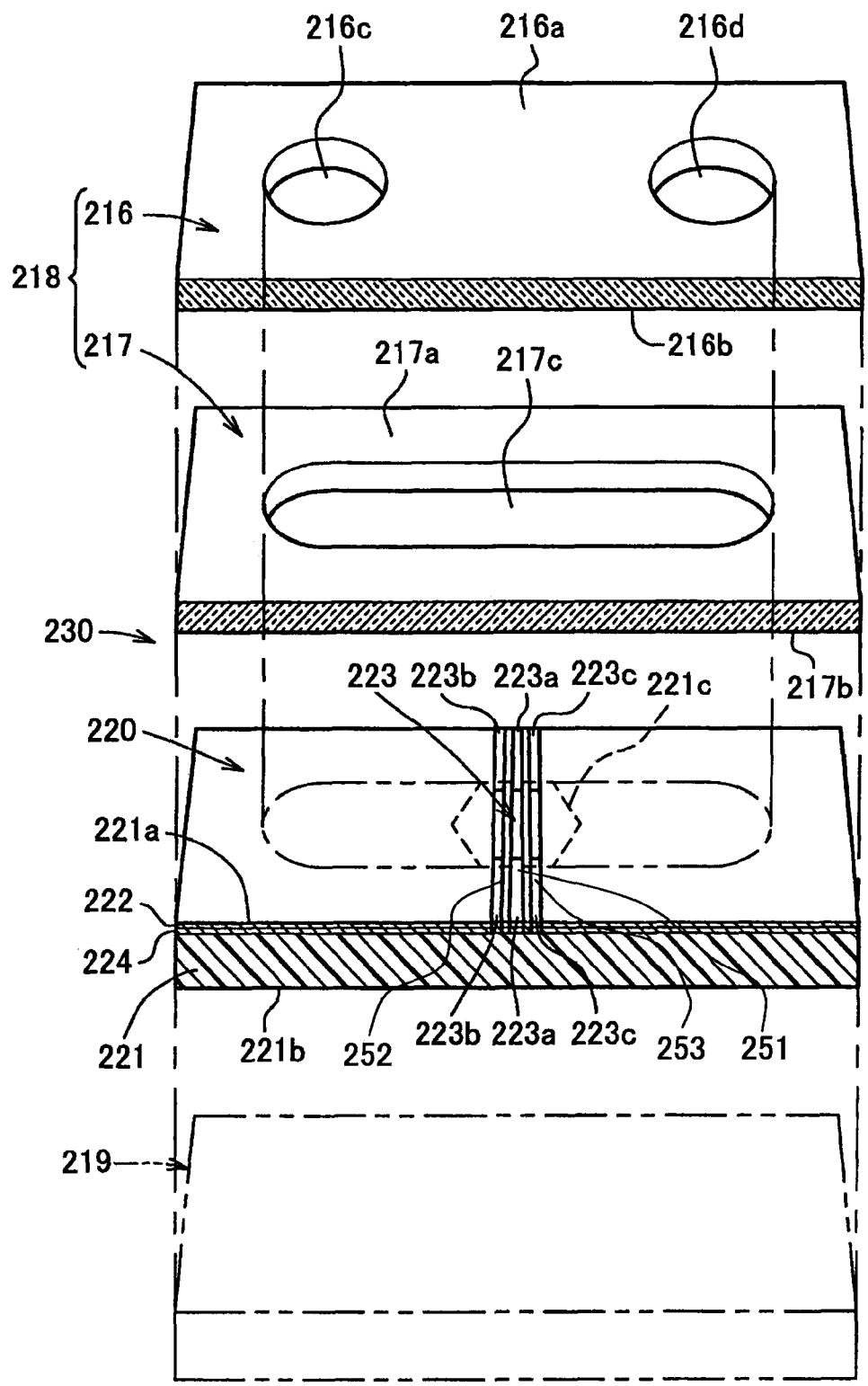
FIG. 8 is an exploded perspective view of one flow sensor formed by cutting the work shown in FIG. 7.

Successively, a flow sensor in accordance with a second embodiment of the present invention and a manufacturing method for the flow sensor are explained with reference to the drawings. FIG. 7 is a perspective view showing the assembling of a work to which the manufacturing method for a flow sensor in accordance with the present invention is applied, and FIG. 8 is a perspective view showing the state in which one flow sensor formed by cutting the work shown in FIG. 7 into a plurality of pieces is disassembled. As indicated by the solid lines in FIG. 7, a work 211 consists of a disc-shaped first wafer 212 formed so as to provide a plurality of flow path forming members 218 after being cut individually, and a second wafer 213 that has the same disc shape as that of the first wafer 212 and is formed so as provide a plurality of sensor chips 220 after being cut individually, and is formed by bonding the first and second wafers 212 and 213 with each other.

The first wafer 212 consists of a first flow path forming wafer 214 and a second flow path forming wafer 215, and is formed so as to provide the plurality of flow path forming members 218 after bonding the first and second flow path forming wafers 214 and 215 to each other and being cut individually. The first flow path forming wafer 214 is integrally formed with a plurality of first flow path forming members 216 formed after being cut. The second flow path forming wafer 215 is integrally formed with a plurality of second flow path forming members 217 formed after being cut, which second flow path forming members 217 correspond to the first flow path forming members 216 and each of which members 217 has the same size as that of the first flow path forming member 216.

As shown in FIG. 8, the first flow path forming member 216 is formed into a plate-like rectangular parallelepiped shape as viewed from the top surface, and when a fluid inflow port 216c for introducing the fluid to be measured is formed at both-side positions on the centerline along the lengthwise direction of an upper surface 216a, a fluid outflow port 216d for delivering the fluid is formed so as to penetrate to a lower surface 216b. These fluid inflow port 216c and fluid outflow port 216d have the same size. The first flow path forming member 216 is formed of transparent borosilicate glass. The fluid inflow port 216c and the fluid outflow port 216d are formed by sandblasting or machining such as end milling, and are finished by wet etching or dry etching.

Also, the first flow path forming member 216 keeps the transparency between the fluid inflow port 216c and the fluid outflow port 216d even in the case where these holes are fabricated by sandblasting because only the fluid inflow port 216c and the fluid outflow port 216d are formed. Thereby, the visibility from the outside is secured.

As the borosilicate glass, for example, a glass called Pyrex (registered trademark) glass or Tempax glass is available. In this embodiment, a transparent Pyrex (registered trademark) glass is used. Thereby, the transparency of the first flow path forming member 216 can be secured. The Pyrex (registered trademark) glass is a material that has a good flatness and is easy to fabricate as compared with frit glass. The Tempax glass may be used for the first flow path forming member 216.

As shown in FIG. 8, the second flow path forming member 217 is formed into a plate-like rectangular parallelepiped shape having the same size as that of the first flow path forming member 216, and is formed with an elliptical (track-shaped) elongated hole 217c that is long along the lengthwise direction and is formed on the centerline along the lengthwise direction of an upper surface 217a so as to penetrate to a lower surface 217b (hereinafter referred to as a "through hole 217c"). This through hole 217c is formed so that the width thereof is the same as the diameter of the fluid inflow port 216c or the fluid outflow port 216d, and semicircular parts at both ends thereof coincide with the semicircular parts on both end sides of the fluid inflow port 216c and the fluid outflow port 216d.

The width of the through hole 217c is wider than the width of a flow rate detecting part 223 formed on the sensor chip 220. The through hole 217c is formed by sandblasting or machining such as end milling, and is finished by wet etching or dry etching.

The second flow path forming member 217 is formed of, for example, a silicon plate, and the through hole 217c is used as a flow path for a fluid flowing in the flow rate detecting part 223 formed on the sensor chip 220.

By forming the second flow path forming member 217 of an easy-to-fabricate silicon plate, the thickness thereof can be fabricated exactly into a fixed thickness. Thereby, the depth of the through hole 217c, that is, the cross-sectional area of flow path can be formed exactly. By bonding the first flow path forming member 216 and the second flow path forming member 217 with each other, the flow path forming member 218 is formed.

In FIG. 7, in the first flow path forming members 216 of the first flow path forming wafer 214 constituting the first wafer 212 and the second flow path forming members 217 of the second flow path forming wafer 215, the fluid inflow ports 216c, the fluid deliver holes 216d, and the through holes 217c, which are shown in FIG. 8, are omitted to simplify the drawing.

The second wafer 213 is integrally formed with the plurality of sensor chips 220 each of which corresponds to the first flow path forming members 216 and the second flow path forming member 217 and has the same size as the sizes of the flow path forming members 216 and 217. The sensor chip 220 is configured so that an electric insulating film (thin film) 222 of silicon nitride or silicon dioxide is formed on an upper surface 221a of a silicon substrate 221 having a plate-like rectangular parallelepiped shape, a flow rate detecting part (sensor part) 223 is formed at the central position of the electric insulating film 222, and further the flow rate detecting part 223 is covered by an electric insulating film 224 of silicon nitride or silicon dioxide. In FIG. 8, the electric insulating film 224 is drawn so as to be transparent for ease of understanding of the flow rate detecting part 223.

At the central position of the upper surface 221a of the silicon substrate 221, a concave part 221c is formed at the lower position of the flow rate detecting part 223. The portion in which the electric insulating film 222 formed with the flow rate detecting part 223 covers the concave part 221c, which serves as a diaphragm, thermally isolates the flow rate detecting part 223 from the silicon substrate 221. The flow rate detecting part 223 is a thermal detecting part, and is formed by a heater 251, serving as a heat generating element, formed on the electric insulating film 222 using, for example, a platinum (Pt) thin film, and temperature measuring elements 252 and 253, serving as resistive elements, which are arranged at equal intervals on the upstream side and the downstream side of the heater 251 and each of which is formed by, for example, a platinum thin film.

Lead patterns 223a, 223b and 223c, serving as signal take-off wires for the heater 251 and temperature measuring elements 252 and 253 of the flow rate detecting part 223, are extended to the positions on both side surfaces on both sides (width direction). The tip end parts of these lead patterns 223a to 223c can be connected to the external measurement circuit via a lead wire, not shown. In FIG. 7, the details of the sensor chip 220 of the second wafer 213 shown in FIG. 8 are omitted to simplify the drawing.

The reasons why a silicon member is used as the second flow path forming member 217 are that the substrate 221 of the sensor chip 220 is made of silicon, that the material of the second flow path forming member 217 is preferably a substance having a thermal expansion coefficient approximately equal to that of silicon and borosilicate glass because the first flow path forming member 216 is made of borosilicate glass, and that the cross-sectional area of sensor flow path near the flow rate detecting part 223 can be formed as designed because the fabrication accuracy is high.

The reason why the silicon substrate 221 of the sensor chip 220 and the second flow path forming member 217 are preferably made of a material having a thermal expansion coefficient approximately equal to each other is that if these elements have thermal expansion coefficients approximately equal to each other, the sensor chip 220 bonded to the insulating material is less liable to be distorted by the temperature change etc. around the sensor chip 220 and the insulating material, so that the output of the flow sensor is difficult to drift, whereby the measurement accuracy of sensor can be prevented from decreasing. Incidentally, the thermal expansion coefficient of Pyrex (registered trademark) glass is $3.2 \times 10^{-6}/°$ C., and the thermal expansion coefficient of silicon is $2.3 \times 10^{-6}/°$ C.

Next, the manufacturing process for the work 211 is explained with reference to the drawings. First, as shown in FIG. 7, the first flow path forming wafer 214 and the second flow path forming wafer 215 are positioned and lapped on each other, and a lower surface 214b of the first flow path forming wafer 214 and an upper surface 215a of the second flow path forming wafer 215 are bonded to each other by a method such as anode bonding to form the first wafer 212.

When the first flow path forming wafer 214 and the second flow path forming wafer 215 are positioned, these wafers are arranged so that the fluid inflow port 216c and the fluid deliver hole 216d formed in each of the fluid path forming members 216 of the first flow path forming wafer 214 shown in FIG. 8 coincide with both ends of the through hole 217c formed in each of the flow path forming members 217 corresponding to the second flow path forming wafer 215 and communicate with the through hole 217c. Thereby, the first wafer 212 is integrally formed with the plurality of flow path forming members 218 after being separated shown in FIG. 8. Also, the second wafer 213 is integrally formed with the plurality of sensor chips 220 after being separated so as to correspond to the flow path forming members 218 of the first wafer 212.

FIG. 9 shows a manufacturing process for the manufacturing method for a flow sensor 230. The first wafer 212, which is formed by bonding the first flow path forming wafer 214 and the second flow path forming wafer 215 to each other as described above, is placed, as shown in FIG. 9B, on the upper surface of the second wafer 213, which is formed with the plurality of sensor chips 220 as shown in FIG. 9A, and is positioned so that the flow path forming members 218 correspond to the sensor chips 220 and that the flow rate detecting part 223 of the sensor chip 220 is exposed at the substantially central position in the through hole (flow path) 217c of the corresponding flow path forming member 218.

Then, the lower surface of the first wafer 212, that is, a lower surface 215b of the second flow path forming wafer 215 and an upper surface 213a of the second wafer 213 are bonded to each other by a glass having a low melting point such as frit glass. Thus, the work 211 is formed. Incidentally, the thickness of the work 211 is about 0.5 to 4.0 mm. Thereby, the work 211 is integrally formed with the plurality of flow sensors 230 after being separated, each of which has the sensor chip 220 and the flow path detecting member 218 as a set. The upper surface of the first wafer 212, that is, an upper surface 214a of the first flow path forming wafer 214 is masked by affixing a simple seal (tape) 233 onto the upper surface 214a to close the fluid inflow ports 216c and the fluid outflow ports 216d that are open in the upper surface. Thereby, swarf, liquid coolant, and the like can be prevented effectively from entering into the flow paths 217c through the fluid inflow ports 216c and the fluid outflow ports 216d.

Next, the work 211 is cut by dicing, not shown, together with the seal 233, and thereby is separated into flow sensors 230 as shown in FIG. 9C. Swarf, liquid coolant, and the like produced at this cutting time is surely prevented from entering into the flow path 217c through the fluid inflow port 216c and the fluid outflow port 216d by the seal 233. Thereby, the flow rate detecting part 223 can be protected from swarf, and also the diaphragm of the flow rate detecting part 223 can be effectively prevented from being damaged by the shock of liquid coolant. Therefore, the occurrence of defective products can be restrained, and also the product yield can be improved. Also, for the separately formed flow sensor 230, the cut surface (side surface) 230a thereof is flush, and the external dimensions do not vary. If the external shape of chip is made uniform by dicing in this manner, the variations in external dimensions are restrained, so that the assembling can be performed easily.

Also, after the flow sensor 230 has been separated, the seal 233 is still kept until the next step, by which dirt can be prevented from entering into the through hole (flow path) 217c through the fluid inflow port 216c and the fluid outflow port 216d, and therefore the keeping of the seal 233 is effective in storage, transportation, and the like.

Since the flow rate detecting part 223 is exposed into the through hole 217c forming a part of the sensor flow path, the flow sensor 230 can measure the fluid to be measured, and the flow rate detecting part 223 can be seen from the outside of the flow sensor 230 through the first flow path forming member 216, which is a transparent member. In this example, the flow rate detecting part 223 can be seen in visible light. However, in the scope of the present invention, the configuration may be made such that the flow rate detecting part 223 can be seen in light having a frequency other than that of visible light.

When the work 211 is cut, it may be cut without affixing the seal onto the upper surface of the first wafer 212 in the above-described manner. In this case, the work 211 is cut in the state in which the work 211 is turned over, that is, the first wafer 212 formed with the fluid inflow ports 216c and the fluid outflow ports 216d is on the downside, and the second wafer 213 is on the upside, by which swarf and liquid coolant can be prevented from entering into the through hole (flow path) 217c in the flow path forming member 218.

Figure 10:
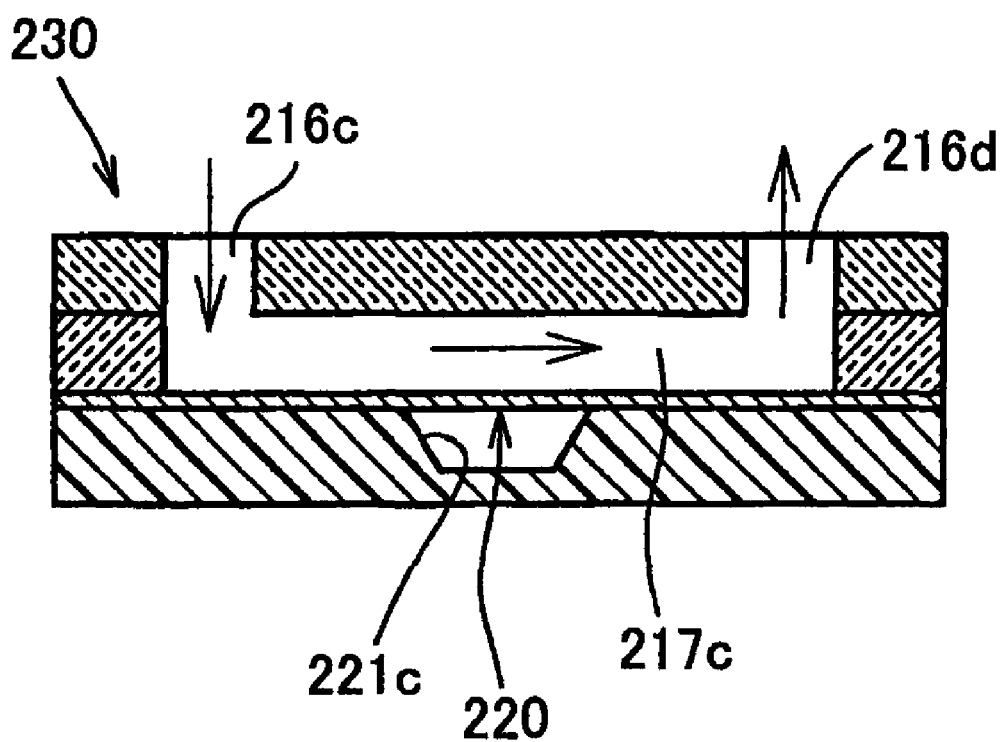
FIG. 10 is an enlarged view of a flow sensor manufactured by the manufacturing method shown in FIG. 9.

FIG. 10 is an enlarged view of the flow sensor 230 manufactured by the manufacturing method shown in FIG. 9. The flow sensor 230 is attached to, for example, a semiconductor manufacturing apparatus, the fluid inflow port 216c and the fluid outflow port 216d are airtightly connected to the passage of the fluid to be measured of the semiconductor manufacturing apparatus, and the fluid to be measured flows as indicated by an arrow mark in FIG. 10. Also, the lead patterns 223a to 223c of the sensor chip 220 shown in FIG. 8 are connected to the measurement circuit, not shown.

The fluid to be measured is introduced from the fluid inflow port 216c into the through hole 217c serving as a flow path, and is delivered from the fluid outflow port 216d after flowing in the through hole 217c. At this time, the heater 251 of the flow rate detecting part 223 is energized. The heater 251 is heated to a certain temperature higher than the gas temperature, which is measured by an ambient temperature sensor provided on the silicon substrate 221, by a control circuit, and heats the gas flowing in the through hole (flow path) 217c.

When the gas does not flow, uniform temperature distribution is formed on the upstream side and the downstream side of the heater 251, and the temperature measuring element 252 on the upstream side and the temperature measuring element 253 on the downstream side show a resistance value corresponding to the approximately equal temperature. On the other hand, when the gas flows, the uniform temperature distribution on the upstream side and the downstream side of the heater 251 becomes out-of-balance: the temperature on the upstream side decreases, and the temperature on the downstream side increases. The difference in resistance value between the temperature measuring elements 252 and 253, that is, the temperature difference is detected by, for example, a Wheatstone bridge circuit formed by the temperature measuring element 252 on the upstream side and the temperature measuring element 253 on the downstream side, by which the flow rate of gas flowing in the through hole (flow path) 217c is measured.

In the above-described embodiment, the case where the indirectly heated flow rate detecting part is formed by one heater (heat generating element) and two temperature measuring elements arranged on both sides of the heater has been described. However, the present invention is not limited to this configuration. A self-heat generating flow rate detecting part may be formed by one heat generating element, that is, one heater. Alternatively, a self-heat generating flow rate detecting part may be formed by two heat generating elements, that is, two heaters.

Also, in the above-described embodiment, the case where the first wafer 212 is formed by bonding two wafers, that is, the first flow path forming wafer 214 formed with the fluid inflow ports 216c and the fluid outflow ports 216d and the second flow path forming wafer 215 formed with the through holes (flow paths) 217c communicating with the fluid inflow ports 216c and the fluid outflow ports 216d has been described. However, the present invention is not limited to this configuration. As the first wafer 212, one wafer integrally formed with the fluid inflow ports, the fluid outflow ports, and the flow paths communicating with these holes may be used. In this case as well, the first water preferably uses borosilicate glass having a thermal expansion coefficient approximately equal to that of the sensor chip 220 made of silicon.

Also, in the case where an insulating seating, for example, a glass seating is provided on a lower surface 221b of the silicon substrate 221 to improve the insulating properties of the sensor chip 220 of the flow sensor 230, a third wafer 219 made of glass may be bonded to a lower surface 213b of the second wafer 213 as indicated by the two-dot chain line in FIGS. 7 and 8, and these three wafers may be cut as a unit. The third wafer 219 preferably uses borosilicate glass having a thermal expansion coefficient approximately equal to that of the sensor chip 220 made of silicon as described above.

As described above, according to the second embodiment of the present invention, the work is formed by bonding the first wafer formed with the plurality of flow path forming members to the second wafer formed with the plurality of sensor chips so as to correspond to the flow path forming members. The work is positioned so that the flow rate detecting parts are exposed into the flow paths of the flow path forming members, and the plurality of flow sensors, each of which is formed by the sensor chip and the flow path forming member as a set, are formed. This work is cut by dicing, by which the plurality of flow sensors are separated.

Thereby, when the flow sensors are separated, chips can be prevented from adhering to the flow rate detecting part of the sensor chip, and when the work is cut by dicing, chips and liquid coolant can be prevented effectively from entering into the flow path through the fluid inflow port and the fluid outflow port. As a result, the adhesion of chips to the flow rate detecting part, the damage to the flow rate detecting part caused by the shock of liquid coolant, and the like are prevented. Also, since the flow sensor has a flush cut surface cut by dicing, a positional shift between the flow path forming member and the sensor chip does not occur, and therefore the external dimensions do not vary. If the external shape of chip is made uniform by dicing in this manner, the variations in external dimensions are restrained, so that assembling can be performed easily.

Also, by adding a masking step for closing the opening of the flow path of the flow path forming member to between the work forming step and the sensor separating step, swarf can be prevented surely from entering into the flow path of the flow path forming member when the flow sensors are separated, and swarf can be prevented from adhering to the flow rate detecting part of the sensor chip. Also, swarf and liquid coolant can be prevented effectively from entering into the flow path through the fluid inflow port and the fluid outflow port when the work is cut by dicing. As a result, the adhesion of swarf to the flow rate detecting part, the damage to the flow rate detecting part caused by the shock of liquid coolant, and the like are prevented.

As a result, the product yield is improved. Also, a flow sensor having a good heat balance can be formed by a low-cost and simple process. Therefore, the manufacturing method in accordance with the present invention is very effective in manufacturing the flow sensor in which the flow rate detecting part is formed delicately with high sensitivity. Also, during the process after cutting and until the next step or during transportation, dirt can be prevented from entering into the flow path.

Also, in the sensor separating step in which the work is cut, by cutting the work in the state in which the opening of the flow path of the flow path forming member is directed to the downside (the work is turned over), that is, the second wafer (the sensor chip side) is on the upside, and the first wafer (the flow path forming member side) is on the downside, swarf can be made less liable to enter into the flow path of the flow path forming member when the flow sensors are separated. Thereby, swarf can be made less liable to adhere to the flow rate detecting part of the sensor chip, and also swarf and liquid coolant can be made less liable to enter into the flow path through the fluid inflow port and the fluid outflow port when the work is cut by dicing. As a result, the adhesion of swarf to the flow rate detecting part, the damage to the flow rate detecting part caused by the shock of liquid coolant, and the like are prevented by a low-cost and simple process, and the product yield is improved.

Also, the flow path forming member is formed by the first flow path forming member and the second flow path forming member, and the first wafer is formed by bonding the first flow path forming wafer formed with the first flow path forming members and the second flow path forming wafer formed with the second flow path forming members to each other. In the first flow path forming wafer, each of the plurality of flow path forming members is provided with the fluid inflow port and fluid outflow port for the fluid to be measured, and in the second flow path forming wafer, each of the plurality of the flow path forming members is provided with the through hole that forms the flow path along the flow of fluid flowing along the flow rate detecting part. Both ends of the through hole communicate with the fluid inflow port and the fluid outflow port, and the flow rate detecting part is arranged in the through hole. Thereby, the flow path forming member can be formed easily, and the first wafer can be configured easily. Also, the cross-sectional area of the flow path of the flow path forming member can be formed exactly, and the individual difference between the flow sensors can be decreased.

What is claimed is:

1. A flow sensor for use with a fluid, the flow sensor comprising:
a sensor chip; and
a flow path forming member provided on the sensor chip and forming a flow path having a predetermined cross-sectional area for the fluid;
wherein the sensor chip comprises:
a substrate, the substrate comprising a concave part formed in an upper surface of the substrate;
a flow rate detecting part formed on an electric insulating film coated so as to cover at least a part of the concave part; and
a lead pattern extending from the flow rate detecting part to a point on an edge of the substrate;
the flow path forming member comprises:
a first flow path forming member having a plate shape and being provided with an inflow port and an outflow port, the first flow path forming member being transparent;
a second flow path forming member having a plate shape and being provided with a through hole which forms the flow path;
wherein the second flow path forming member is provided on the substrate, and the first flow path forming member is provided on the second flow path forming member;
the through hole is configured so that ends of the through hole communicate with the inflow port and the outflow port;
the first flow path forming member is joined with the second flow path forming member to form the flow path;
the first flow path forming member further comprises a first notch provided on a side of the first flow path member and extending through a thickness of the first flow path member;
the second flow path forming member further comprises a second notch provided on a side of the second flow path member and extending through a thickness of the second flow path member;
the first notch and the second notch are configured so that the first notch and the second notch coincide with each other; and
the first notch and the second notch are aligned with the point on the edge of the substrate to which the lead pattern is extended;
the flow rate detecting part is arranged between the portions corresponding to the inflow port and the outflow port of the through hole.

2. The flow sensor according to claim 1, wherein the second flow path forming member is formed by a member having a thermal expansion coefficient equal to or approximately equal to that of the sensor chip.

3. The flow sensor according to claim 2, wherein the second flow path forming member is formed of either one of silicon and borosilicate glass.

4. The flow sensor according to claim 3, wherein the first flow path forming member is formed of borosilicate glass.

5. A flow sensor workpiece comprising:
a first wafer comprising a plurality of flow path forming members each defining a flow path; and
a second wafer comprising a plurality of sensor chips each having a flow rate detecting part;
wherein the first wafer is provided on the second wafer;
the first wafer and the second wafer are configured such that each of the plurality of flow path forming members corresponds to one of the plurality of sensor chips so that the flow rate detecting part is provided in the flow path defined by the flow path forming member; and
the first wafer comprises:
a first flow path forming wafer comprising a plurality of first flow path forming members; and
a second flow path forming wafer comprising a plurality of second flow path forming members;
the first flow path forming wafer is provided on the second flow path forming wafer;
the first flow path forming wafer and the second flow path forming wafer are configured such that each of the plurality of first flow path forming members corresponds to one of the plurality of second flow path forming members; and
each corresponding first flow path forming member and second flow path forming member together form one of the plurality of flow path forming members.

6. The flow sensor workpiece according to claim 5, wherein
each of the plurality of first flow path forming members included in the first flow path forming wafer is provided with an inflow port and a outflow port; and
each of the plurality of second flow path forming members included in the second flow path forming wafer is provided with a through hole which forms the flow path, and ends of the through hole communicate with the inflow port and the outflow port of the corresponding first flow path forming member, and the plurality of flow rate detecting parts included in the second wafer are arranged in the plurality of through holes included in the second flow path forming wafer.

7. A manufacturing method for a flow sensor comprising a flow path forming member defining a flow path provided on a sensor chip having a flow rate detecting part such that the flow rate detecting part is provided in the flow path, the manufacturing method comprising:
providing a first wafer formed with a plurality of the flow path forming members;
providing a second wafer formed with a plurality of the sensor chips;
positioning the first wafer and the second wafer such that each of the flow rate detecting parts in the plurality of sensor chips is provided in one of flow paths defined by the plurality of flow path forming members;
bonding the first wafer to the second wafer formed with the plurality of sensor chips; and
cutting the bonded first wafer and second wafer by dicing to separate the bonded first wafer and second wafer into a plurality of the flow sensors; wherein
the flow sensor is configured so that each of the plurality of flow path forming members is formed by a first flow path forming member and a second flow path forming member;
the first wafer is formed by bonding a first flow path forming wafer including the plurality of first flow path forming members and a second flow path forming wafer including the plurality of second flow path forming members to each other.

8. The manufacturing method for a flow sensor according to claim 7, further comprising:
affixing a seal onto an upper surface of the first wafer before cutting the bonded first wafer and second wafer.

9. The manufacturing method for a flow sensor according to claim 7, wherein the cutting the bonded first wafer and second wafer is performed in a state in which an opening of the flow path of the flow path forming member is directed to a downside.

10. The manufacturing method for a flow sensor according to claim 7, wherein
each of the plurality of first flow path forming members included in the first flow path forming wafer is provided with an inflow port and a outflow port; and
each of the plurality of second flow path forming members included in the second flow path forming wafer is provided with a through hole which forms the flow path, and ends of the through hole communicate with the inflow port and the outflow port of the corresponding first flow path forming member, and the plurality of flow rate detecting parts included in the second wafer are arranged in the plurality of through holes included in the second flow path forming wafer.

* * * * *